United States Patent [19]

Beach

[11] 4,354,989
[45] Oct. 19, 1982

[54] EXTRUSION OF INSULATING PLASTIC

[75] Inventor: Shirley Beach, North Vancouver, Canada

[73] Assignee: Phillips Cables Limited, Brockville, Canada

[21] Appl. No.: 250,166

[22] Filed: Apr. 2, 1981

[30] Foreign Application Priority Data

Jun. 17, 1980 [CA] Canada ................................. 354140

[51] Int. Cl.³ ........................ B29D 27/00; B29F 3/10
[52] U.S. Cl. .................................. 264/40.6; 264/40.2; 264/45.9; 264/511; 264/571; 264/174; 425/113; 425/114; 425/141; 425/467
[58] Field of Search ...................... 264/174, 40.6, 45.9, 264/46.1, 40.2, 511, 568, 571; 425/113, 114, 467, 141

[56] References Cited

U.S. PATENT DOCUMENTS

| | | | |
|---|---|---|---|
| 2,893,056 | 7/1959 | Henning | 425/113 |
| 2,980,958 | 4/1961 | Ellis, Jr. | 425/113 |
| 3,071,809 | 1/1963 | Lerch | 425/113 |
| 3,087,007 | 4/1963 | Jachimowicz | 264/174 |
| 3,538,547 | 11/1970 | Drabb | 425/113 |
| 3,581,343 | 6/1971 | Henrikson et al. | 425/113 |
| 3,860,686 | 1/1975 | Myers | 425/113 |
| 3,903,233 | 9/1975 | Dougherty | 264/174 |
| 3,914,357 | 10/1975 | Cereijo | 425/113 |
| 4,165,957 | 8/1979 | Kertscher | 425/113 |
| 4,279,851 | 7/1981 | Lord et al. | 425/113 |

Primary Examiner—Jeffery R. Thurlow
Attorney, Agent, or Firm—Bachman and LaPointe

[57] ABSTRACT

Molten plastic material is extruded uniformly about an advancing core by dividing a single stream of the plastic flowing to a die assembly transversely to the direction of advance of the core, into a plurality of streams, in which one half of the plastic flows along a first path spaced around the core and then towards the core; the other half of the plastic flows in a second path which is, in essence, a mirror image of the first path; the divided streams are reunited as a tubular sleeve of flowing plastic flowing in the direction of the advancing core, spaced around the core and flowing towards the advancing core.

28 Claims, 8 Drawing Figures

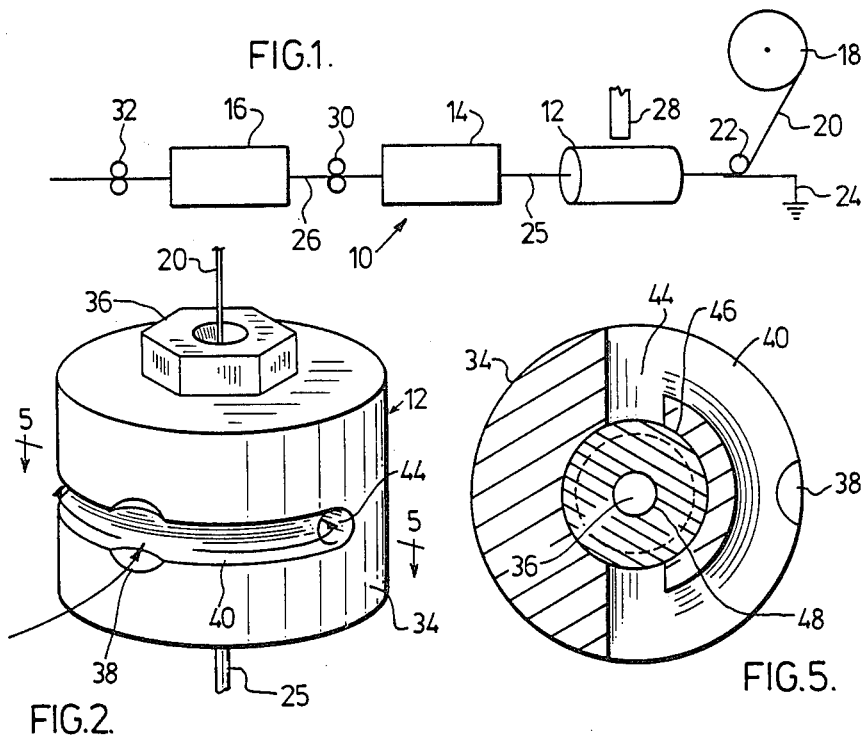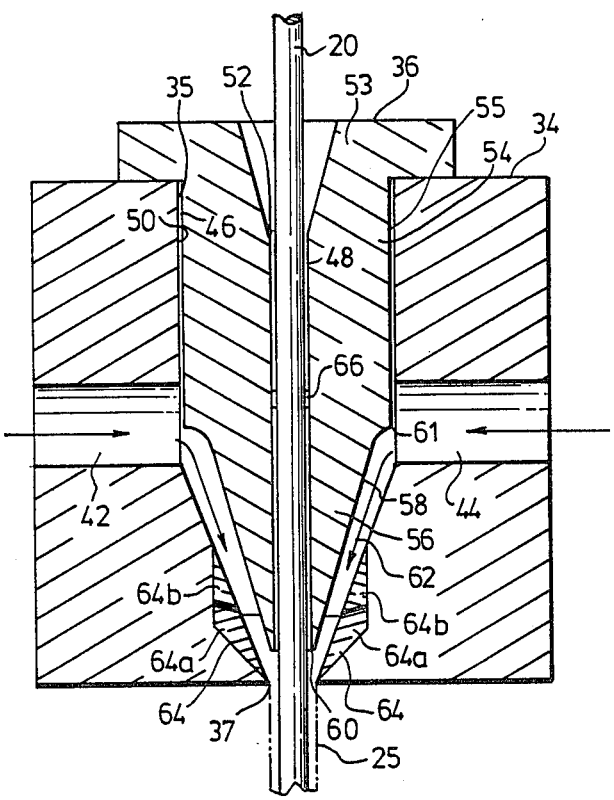

EXTRUSION OF INSULATING PLASTIC

BACKGROUND OF THE INVENTION (a) Field of the Invention

This invention is concerned with die assemblies, more especially with die assemblies for use with a screw extruder to provide an insulating plastic covering on a core; the invention is also concerned with a method of extruding an insulating plastic covering around an advancing core.

(b) Description of Prior Art

Electrical conductor wires in, for example, power cables and communication cables are electrically insulated by extruding a molten plastic around the wire as it advances through a cross-head die assembly and solidifying the plastic on the wire.

The insulating covering, particularly in a communication cable conductor wire, may be cellular or solid. In the case of cellular coverings the molten plastic material contains gaseous material which expands as bubbles in the molten material as the coated wire emerges from the die assembly. The degree of expansion is controlled by the cooling to solidification, which is suitably achieved by advancing the coated wire through a water trough which moves in response to signals from a capacitance monitor.

Similarly an insulating sleeve may be formed around a bundle of insulated conductors by extruding the molten plastic around the advancing bundle. In the case of communication cables the bundle suitably has a shield of aluminum wrapped around it, the shield conveniently having a synthetic coating of a carboxylated polymer which adheres readily to the molten plastic extruded around it.

Insulating coverings particularly in communication cables are required to meet exacting standards, particularly with regard to their thickness. The thickness of the covering and the degree of cellularity in the case of cellular insulation, at any point along the insulated covering determines the electrical characteristics, for example, the dielectric properties of the insulated conductor. Variations in the electrical characteristics along the insulated conductor can result in cross-talk in a telephone cable and this is difficult to eliminate.

It is generally desirable and necessary to form an insulating covering on a conductor particularly for a communication cable, which is uniform along the insulated conductor.

Generally the concentricity, roundness and uniformity of the insulating covering must be carefully controlled.

In many cases it has, in addition, been a practice to provide a thicker insulating covering than actually required so that at least a minimum insulation will be provided over the entire wire surface, however, this is uneconomic.

In the conventionally employed cross-head die assemblies molten plastic insulating material is extruded from a screw extruder into the die assembly, in a direction transverse to the direction of travel of the core advancing through the die assembly and onto the advancing core. This necessitates that the stream of molten plastic undergo at least one 90° change in direction in its flow path, which results in flow imbalance conditions in the molten plastic. In particular a differential of pressure or flow is set up between the molten plastic in the outside regions of the bending stream and the molten plastic in the inside region of the bending stream.

The flow imbalances in the stream as it flows onto an advancing core cause eccentricity between the insulating covering and the core, and lack of roundness of the outer circumference of the extruded covering. This results in cross-sectional and longitudinal variations in the thickness of the formed covering, which, as indicated above, is unacceptable.

In U.S. Pat. No. 3,860,686, Daryl Lester Myers, issued Jan. 14, 1975, a multi-path cross-head die assembly has been proposed. In the die assembly of Myers the molten plastic is subjected to a number of changes of flow in which the stream is divided and the direction of flow is changed. Unfortunately the Myers die assembly is impractical, particularly in that it is almost impossible to adequately clean the inaccessible, multiplicity flow channels which define a tortuous path for molten material in the assembly. It is necessary to thoroughly clean die assemblies, for example, to remove deposits of charred plastic which may collect, particularly in corners, and when the plastic being extruded is to be changed.

Thus the Myers die assembly does not provide a practical solution to the problem and does not appear to have been exploited commercially.

It is an object of the present invention to provide a die assembly which overcomes the prior difficulties and enables the formation of an insulating covering of an acceptable high standard of uniformity on an advancing core while at the same time the surfaces of the assembly exposed to molten plastic are accessible and can be cleaned without difficulty in a simple cleaning operation.

It is a further object of the invention to provide die assemblies which can be employed to form insulating coverings on electrical conductor wires, as well as insulating sheaths around bundles of insulated conductor wires.

It is a further object of the invention to provide an extrusion die for use in the extrusion of molten insulating plastic around an advancing core.

It is a further object of the invention to provide a core guide for guiding an advancing core through an extrusion die.

It is yet another object of the invention to provide a method of extruding an insulating plastic covering around an advancing core, particularly an advancing electrical conductor wire.

SUMMARY OF THE INVENTION

According to the invention there is provided a method of extruding an insulating plastic covering around an advancing core which comprises: guiding an advancing core through an extrusion die, forcing a stream of molten insulating material to said die, transversely of said advancing core, dividing said stream into a plurality of streams, with at least two of the streams flowing in opposite directions, in paths spaced around the advancing core, directing said streams inwardly towards each other, deflecting said inwardly directed streams to form a tubular stream flowing in the direction of the advancing core and spaced around the advancing core, said tubular stream flowing towards said advancing core, contacting said advancing core and the flowing tubular stream to form a continuous coating of said molten material on said advancing core, and cooling said molten material to form a solidifed covering of insulating plastic on said core.

The advancing core may comprise a bare electrical conductor wire, for example, a copper wire, or a bundle of insulated conductor wires wrapped in a shield.

The molten insulating plastic may suitably comprise a polyolefin, for example, polyethylene including low density, medium density and high density polyethylene, polypropylene and mixtures thereof, or a halogenated polyolefin or copolymer of an olefin or haloolefin with a comonomer, for example, polyvinyl chloride.

In another aspect of the invention there is provided a die assembly for the extrusion of molten insulating plastic around an advancing core, including an extrusion die having a bore therethrough defining an inlet and an outlet, opposed to said inlet, for an advancing core, channel means spaced around said bore, for flow of molten plastic, a plurality of inwardly directed passages communicating said channel means with said bore, and a core guide having a continuous bore therethrough for an advancing core adapted to be removably seated in the die bore, said core guide including a deflecting surface which defines with said die bore an annular space, said deflecting surface being adapted to deflect molten plastic delivered through said passages along said annular space towards said die bore outlet.

In yet another aspect of the invention there is provided the die of the die assembly of the invention.

In still another aspect of the invention there is provided the core guide of the die assembly of the invention.

BRIEF DESCRIPTION OF THE DRAWINGS

The invention is illustrated in particular and preferred embodiments by reference to the accompanying drawings in which:

FIG. 1 illustrates schematically an apparatus for forming a cellular insulating covering on a conductor wire, including a die assembly of the invention, FIG. 2 is a front perspective view of a die assembly of the invention, FIG. 3, which is alongside FIG. 4 is a front cross-section along line 4—4 of the die assembly of FIG. 2, FIG. 5, which appears alongside FIG. 2, is a plan cross-section along a line 5—5 of the die assembly of FIG. 2, FIG. 6 is a perspective view of the core tube of the die assembly of FIG. 2.

DESCRIPTION OF THE PREFERRED EMBODIMENTS WITH REFERENCE TO THE DRAWINGS

Figure 3:
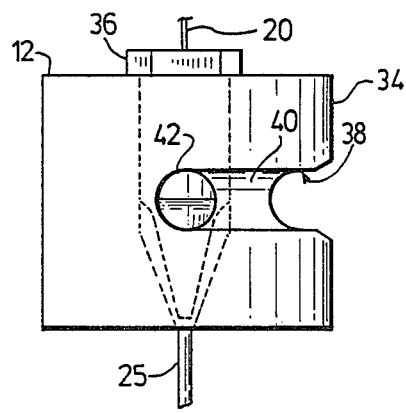
Figure 6:
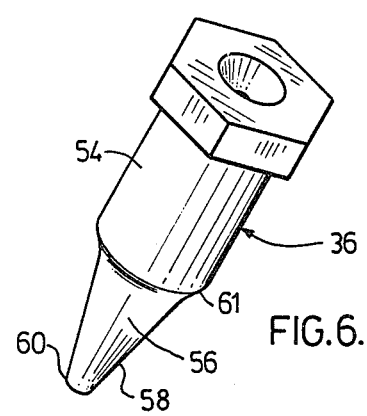
FIG. 6, is a side perspective view of the die assembly of FIG. 2.

With further reference to FIG. 1 an apparatus generally designated 10, for forming a cellularly insulated electrical conductor wire 26 includes a die assembly 12, a moving water trough 14, a capacitance monitor 16 and an extruder 28.

Wire 20 to be insulated is fed from a spool 18 around a roller 22, and through die assembly 12. The wire 20 is grounded at 24.

Molten plastic insulating material containing a gas is extruded from extruder 28 to die assembly 12 in a direction transverse to the direction of the advancing wire 20 and a coated wire 25, in which the coating is of the molten plastic, emerges from die assembly 12; with the release of the extrusion pressure the gas in the molten plastic begins to expand as gas bubbles, and the coated wire 25 is fed through moving water trough 14 to solidify the molten material, the insulated wire 26 from trough 14 passes between rolls 30 and through capacitance monitor 16 and thence is conveyed to a collection spool (not shown) by rolls 32.

Trough 14 moves responsive to signals from capacitance monitor 16 to control the position at which coated wire 25 enters trough 14 and hence the degree of expansion of gas in the molten plastic, in a manner which is well known.

With further reference to FIGS. 2 to 6, a die assembly 12 comprises a die 34 and a core tube 36. Die 34 includes an entry port 38 for molten plastic, a circumferential channel 40 and opposed radial passages 42 and 44.

Radial passages 42 and 44, which are diametrically opposed, communicate at their inner ends with a machined die bore 46 which passes through the die 34 and defines an inlet 35 and an outlet 37.

The centre lines of circumferential channel 40 and passages 42 and 44 are contained in essentially the same plane.

The core tube 36, as is more particularly shown in FIG. 4, is adapted to be removably seated in the bore 46 of die 34 and includes a head 53, an upper cylindrical centering portion 54, a generally frusto-conical lower portion 56 and a continuous bore 48 therethrough defining a core inlet end 49 and a core outlet end 60.

Cylindrical portion 54 has a machined cylindrical surface 55 which mates with the wall of the die bore 46 with only a narrow clearance 50, whereby the core tube 36 adapts a fixed seated position in die 34, the fixed seated position being in particular a fixed-centered position, in which the core tube 36 is centrally disposed in the die 34.

Frusto-conical portion 56, which extends from centering position 54 to core outlet end 60, includes a deflecting surface 58 which defines with bore 46 an annular space 62 of a cross-section which decreases in the direction of advance of wire 20.

Core outlet end 60 of core tube 36 is disposed within die 34 and spaced apart from outlet 37.

The junction 61 of cylindrical surface 55 and deflecting surface 58, i.e., the junction of centering portion 54 and frusto-conical portion 56, is disposed on the central axis through opposed radial passages 42 and 44.

The bore 46 of die 34 is defined adjacent outlet 37 by an insert 64 of material resistant to wear, and resistant to the molten plastic and the heat therefrom. In a particular embodiment insert 64 includes a carbide tip 64a and a body 64b of a metal alloy resistant to heat and wear; insert 64 conducts heat away from the outlet 37, thereby avoiding excessive heat build-up at outlet 37.

A guide element 66 is disposed in bore 48 of core tube 36 to provide a fine clearance between bore 48 and wire 20. The guide 66 is suitably of a high wear resistant material which can be bored to a fine and accurate tolerance. In particular guide 66 may comprise a diamond having a cylindrical bore lapped therethrough. Such a diamond is resistant to wear and has a long life even with wire speeds of the order of 5,000 feet per minute, and additionally can be lapped to provide a clearance with the wire 20 of about 0.0005 inches.

Figure 7:
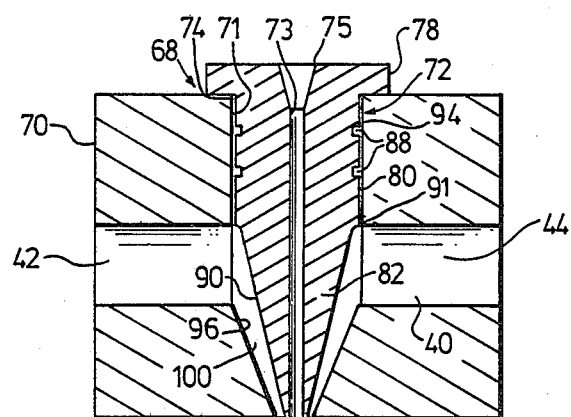
FIG. 7 is a front cross-section of a die assembly of the invention in a different embodiment.
Figure 8:
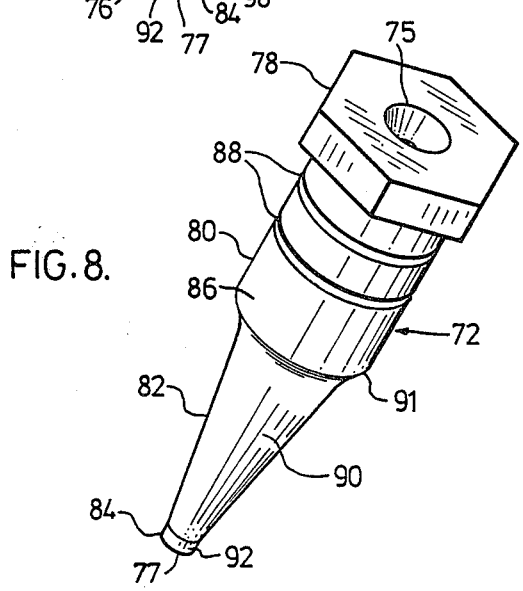
FIG. 8 is a perspective view of the core tube of the die assembly of FIG. 7.

With reference to FIGS. 7 and 8 there is shown a die assembly 68 comprising a die 70 and a core tube 72.

Parts of die 70 common to die 34 are indicated by the same reference numerals. Thus die 70 includes an entry port 38, a circumferential channel 40 and radial passages 42 and 44.

Die 70 includes a die bore 71 therethrough defining an inlet 74 and an outlet 76. Die bore 71 includes a cylindrical surface 94, a generally frusto-conical surface 96 and an end cylindrical surface 98.

Core tube 72 has a continuous bore 73 therethrough between a core inlet end 75 and a core outlet end 77 and includes a head 78, a cylindrical centering portion 80, a generally frusto-conical portion 82 and a cylindrical end portion 84.

Centering portion 80 includes a cylindrical surface 86 and a pair of continuous, spaced apart grooves 88 therein.

Frusto-conical portion 82 defines a deflecting surface 90 which defines an annular space 100 decreasing in cross-section to a cylindrical surface 92 in end portion 84.

As can be seen more clearly in FIG. 7, the junction 91 of cylindrical surface 86 and deflecting surface 90 is disposed adjacent the uppermost walls of radial passages 42 and 44.

An annular space 100 is defined in die 70 between deflecting surface 90 and cylindrical surface 92 of core tube 72 on the one hand, and frusto-conical surface 96 and cylindrical surface 98 of bore 71 on the other hand.

Core outlet end 77 of core tube 72 terminates at outlet 76 of die 70.

In the operation of the die assembly 12 of FIGS. 2 to 6, molten plastic material, which may contain gas to be expanded to form cellular insulation, is extruded from an extruder such as 28 in FIG. 1, to entry port 38 of die assembly 12. At entry port 38, the stream of molten plastic is divided into two equal streams which flow in opposed circumferential directions, i.e., clockwise and anti-clockwise, towards radial passages 42 and 44 respectively.

At the outer extremities of radial passages 42 and 44 the two streams are bent inwardly through an angle of about 90° and flow towards each other along radial passages 42 and 44. The molten plastic material flows into bore 46 and is deflected by deflecting surface 58 to flow along the deflecting surface 58 in annular space 62 towards outlet 37. While being deflected by deflecting surface 58 the molten streams from passages 42 and 44 merge to form a tubular stream or flowing sleeve of molten plastic which is characterized by the absence of a merge or weld line. The tubular stream or sleeve of molten plastic flows along annular space 62 in the direction of advance of wire 20, along the deflecting surface 58 under the extrusion pressure from the screw extruder, such that the tubular stream converges towards wire 20 until it is very close to wire 20, while still under the extrusion pressure, which may typically be of the order of 9,000 p.s.i. Finally, the molten plastic flows over core outlet end 60 of core tube 36, while still under extrusion pressure, changing direction a final time to flow onto the advancing wire 20 as a continuous coating of molten plastic thereon. The thus coated wire 25 continues to advance towards outlet 37 and then advances out of die 34 at outlet 37.

The small clearance 50 is kept to a minimum by the accurate machining of surface 55 and the mating portion of bore 46, whereby back flow of molten plastic between bore 46 and centering portion 54 is substantially avoided.

The combination of the continuous advance of wire 20 in substantially the same direction as that of the flow of the tubular stream, in conjunction with the guide element 66 in core tube bore 48, which provides a very fine clearance, avoids any substantial back flow of molten plastic along bore 48 in a direction opposite that of the advance of wire 20.

In practice it is found appropriate to dimension the frusto-conical portion 56 and the adjacent portion of bore 46 so that the tubular stream flowing over core outlet end 51 of core tube 36 is at an angle of 5° to 6° 30′ to the axis of wire 20.

The deflecting surface 58 of core tube 48 prevents the molten plastic, under high pressure, from contacting the advancing wire 20, until the molten plastic is travelling close to the advancing wire 20. If the molten plastic from passages 42 and 44 were to engage the advancing wire 20 directly on entering bore 46, the high extrusion pressure of the molten plastic would be sufficient to shear the wire 20. On the other hand, deflecting the tubular stream of molten plastic gradually towards the advancing wire 20 while still under the extrusion pressure, and within the die 34, until it is close to the wire 20 and travelling in the same general direction, ensures that the molten plastic in annular space 62 flows directly onto the advancing wire 20, without shearing the wire 20.

The final inward bending or convergence of the wall of the tubular stream which forces the stream onto the wire 20, thus takes place while the stream is under the influence of the high extrusion pressure.

The molten coating of the coated wire 25 advancing from outlet 37 can be solidified in the manner illustrated with reference to FIG. 1.

The flow of the molten plastic material in die assembly 12 is indicated by the arrows in FIGS. 2 and 4.

The method described with reference to FIGS. 2 to 6 is essentially for extrusion coating bare wires, for example, copper conductor wires, where pressure exerted on the wire as the tubular stream is forced onto the advancing wire, will not deform or otherwise damage the wire. However, where a bundle of insulated wires, i.e., previously coated wires, is to be encompassed by a single sleeve, use of the pressure extrusion process described with reference to FIGS. 2 and 6 would damage the already insulated wires, for example, by deforming their coatings, and this would affect the electrical characteristics.

The die assembly illustrated in FIGS. 7 and 8 is employed for forming a covering or sleeve on a bundle of insulated wires and is described hereinafter:

Molten plastic is fed under the extrusion pressure into bore 71 of die 70 via an entry port 38, a circumferential channel 40 and radial passages 42 and 44 in the same manner as described with reference to FIGS. 2 to 6. On entering bore 71 from passages 42 and 44 the molten material is deflected by deflecting surface 90 to form a tubular stream of flowing molten plastic in annular space 100.

The tubular stream flows along annular space 100 and converges towards core outlet end 79. A bundle of insulated wires (not shown) is advanced through bore 73 in the manner described for wire 20 in FIGS. 2 to 6. The cross-section of annular space 100 decreases towards outlet 76.

When the tubular stream reaches portion 84 the direction of flow of the tubular stream changes to flow along cylindrical end surface 92 such that the tubular stream is flowing in a direction substantially parallel with and circumferentially around that of the advancing bundle (not shown).

Cylindrical end portion 84 terminates at outlet 76, the core outlet end 79 of core tube 72 being spaced inwardly of outlet 76 and the tubular stream of molten plastic emerges from outlet 76 and is spaced circumferentially around the advancing bundle.

In order to force the tubular sleeve onto the advancing bundle, a vacuum is applied to core tube bore 73 adjacent head 78. With the application of the vacuum, atmospheric pressure urges the tubular stream emerging from outlet 76 onto the advancing bundle.

Once the process has been started and with the continuous application of the vacuum the tubular stream of molten plastic is forced onto the advancing bundle under pressure, as the tubular stream and the advancing bundle emerge from outlet 76.

In this way the advancing bundle is not subjected to the high extrusion pressure as is the wire 20 in the embodiment of FIGS. 2 to 6, and no deformation of the bundle occurs.

There is no guide element corresponding to guide 66 in core tube bore 73, and such a guide element is not required. Since the tubular stream of molten plastic is not under the high extrusion pressure when it is urged onto the advancing bundle, there is no tendency for backflow of molten plastic in bore 73.

The cylindrical surface 86 of centering portion 80 of core tube 72 and the cylindrical surface 94 of die bore 71 are accurately machined to provide a snug fit in which the core tube 72 is centrally fixed in die 70, and this minimizes backflow of molten plastic along bore 71 from passages 42 and 44. The grooves 88 are useful in increasing the easy removal of core tube 72 from die 70, and in addition serve as a trap for any molten material which might flow back between surfaces 86 and 94.

If found appropriate to control the process and the dimensions of the die assembly 68 such that the cross-sectional area of the covering formed on the advancing bundle is about 80% of the cross-sectional area of the annular space 100 at outlet 76. This permits adequate shrinking of the molten material urged onto the advancing bundle by atmospheric pressure, under the influence of the vacuum applied to core tube bore 73, to permit a uniform covering on the advancing bundle. If the amount of molten plastic material is increased above this ratio the additional plastic material may cause buckling and a non-uniform covering. If the amount of molten plastic material is decreased then the memory of the resulting covering is deleteriously effected producing stress in the covering.

The advancing bundle which is covered employing the die assembly of FIGS. 7 and 8 suitably comprises a plurality of individually insulated conductor wires wrapped in an aluminum shield having an outer coating of a copolymer of ethylene and a carboxyl group containing monomer. Such a shield is available under the trade mark "Zetabond" from Dow Chemical. The copolymer coating provides good adhesion between the shield and the insulating plastic covering.

The die assemblies 12 and 68 which are suitably machined from tool steel can be readily cleaned by means of air jets and wiping with an asbestos cloth. When the core tubes are removed from the dies all the parts of the die and core tube which are contacted by molten plastic in its flow through the die assembly are readily accessible and there are no closed corners to act as collection points for charred plastic and debris from the cleaning operation.

Using the method and die assembly of the invention the molten plastic is formed into the flowing tubular stream or sleeve flowing in the same general direction as the advancing core, and is brought gradually closer to the advancing core before being urged thereon.

The formation of the flowing tubular stream from opposed streams derived by division of a single flowing stream, and subjecting the divided streams to identical flow treatment along identical, but opposite, flow paths, results in the formation of a uniform tubular stream or sleeve, in which the flow characteristics are the same in all cross-sectional portions, whereby a uniform covering of insulating plastic can be formed on an advancing core.

Stated otherwise, a single mass of molten plastic continuously delivered under extrusion to the die assembly of the invention, is divided in the die assembly into a plurality of streams. One half of the plurality is directed along a first flow path, and the other half is directed along a second flow path, which is a mirror image of the first flow path, such that the molten plastic in the two halves is subjected to identical flow treatment along flow paths of identical length and character. The two halves of identical flow characteristics are finally brought together to form a flowing tubular stream or sleeve spaced circumferentially around the advancing core and being concentric therewith. The uniform tubular stream flows towards and is then urged onto the advancing core to form a uniform molten coating, which is solidified to a uniform covering.

The tubular stream flows as an entering wedge towards the advancing core, as a result of the diminishing cross-section of the annular space in the direction of the advancing core; the pressure on the entering wedge in the annular space increases with the decrease in the cross-section of the annular space.

It will be understood that each half of the plurality comprises 50% of the mass or volume of the original single stream.

Preferably the single stream is divided into an even number of streams, each stream flowing in the first direction having a counterpart identical stream flowing in the opposite direction; most preferably the single stream is divided into two equal streams flowing in identical, mirror image paths.

The invention may be employed to form both solid and cellular insulating coverings on an electrically conductive core.

I claim:

1. A method of extruding an insulating plastic covering around an advancing core which comprises:
   guiding an advancing core through an extrusion die,
   forcing a stream of molten insulating material to said die, transversely of said advancing core,
   dividing said stream into a pair of streams, flowing in opposite directions, along paths spaced circumferentially from the advancing core,
   directing said streams radially inwardly towards each other,
   deflecting said radially inwardly directed streams directly along a fixed annular path, to form a tubular stream flowing in the direction of the advancing core and spaced around the advancing core, said tubular stream flowing towards said advancing core and decreasing in cross-section in the direction of flow as it approaches said advancing core, contacting said advancing core and the flowing tubular stream to form a continuous coating of said molten material on said advancing core, and cooling said molten material to form a solidified covering of insulating plastic on said core.

2. A method according to claim 1, wherein said core is an electrical conductor wire.

3. A method according to claim 2, wherein said continuous coating of molten material on said advancing core contains a gas and the cooling is controlled responsive to signals from a capacitance monitoring of the insulated wire to control the gas expansion, whereby a controlled cellular insulating covering is formed.

4. A method of extruding an insulating plastic covering around an advancing core comprising:

advancing the core through a core guide in an extrusion die, forcing a stream of molten insulating plastic into said die, transversely of said advancing core, dividing said stream into a pair of streams, flowing in opposite directions in paths spaced around the advancing core, said paths being spaced circumferentially around the advancing core one of said streams flowing in a clockwise direction and the other flowing in an anti-clockwise direction, flowing said plurality of streams radially inwardly towards each other, deflecting the radially inwardly directed streams at said core guide along a fixed annular path, to form a tubular stream flowing in the direction of the advancing core, and spaced around the advancing core, said tubular stream flowing towards said advancing core and decreasing in cross-section in the direction of flow as it approaches said advancing core, contacting said advancing core and the flowing tubular stream to form a continuous coating of said molten material on said advancing core, and cooling said molten material to form a solidified covering of insulating plastic on said core.

5. A method of extruding an insulating plastic covering around an advancing bare electrical conductor wire comprising:

advancing said bare wire in a first direction through a core guide in an extrusion die, forcing a stream of molten insulating plastic material to said die in a second direction transverse to said first direction, dividing said stream into a pair of streams in paths spaced circumferentially around the advancing wire, the streams of said pair flowing in opposite circumferential directions, directing said streams radially inwardly towards said core guide;

forcing said radially inwardly directed streams together around said core guide to form a sleeve of molten plastic flowing under extrusion pressure along said core guide in a fixed annular path towards said advancing wire, said sleeve decreasing in cross-section in the direction of flow as it approaches said advancing wire, forcing said flowing sleeve, under extrusion pressure, from said annular path onto said advancing wire to form a continuous coating of molten plastic on said advancing wire, advancing the coated wire out of said die, while maintaining said first direction, and cooling said molten coating to form a solidified insulating plastic covering on said wire.

6. A method according to claim 5, wherein said plastic is a polyolefin selected from the group consisting of polyethylene, polypropylene and mixtures thereof.

7. A method according to claim 6, wherein said plastic contains a gas and said cooling is controlled responsive to signals from a capacitance monitoring of the insulated wire to control the gas expansion in the coated wire outside said die, whereby a controlled cellular insulating covering is formed.

8. A method according to claim 5, wherein the radially inwardly directed streams are diametrically opposed.

9. A method of extruding an insulating plastic covering around an advancing core comprising a bundle of insulated electrical conductor wires, which comprises:

advancing said bundle in a first direction through a core guide in an extrusion die, forcing a stream of molten insulating material to said die in a second direction transverse to said first direction, dividing said stream into a pair of streams in paths spaced circumferentially around the advancing core, the streams of said pair flowing in opposite circumferential directions, directing said streams radially inwardly towards said core guide, forcing said radially inwardly directed streams together around said core guide to form a sleeve of molten plastic flowing along said core guide in a fixed annular path towards said advancing core, said sleeve decreasing in cross-section in the direction of flow as it approaches said advancing bundle along an annular path of decreasing cross-section, advancing said core out of said core guide and said die while maintaining said first direction, directing said flowing sleeve from the path of decreasing cross-section in a direction substantially parallel to said first direction to form a cylindrically tubular sleeve spaced circumferentially from said advancing core, applying a vacuum to the interior of said flowing cylindrically tubular sleeve, passing said flowing cylindrically tubular sleeve off the core guide and out of the die, circumferentially around said advancing core, urging said flowing cylindrically tubular sleeve under atmospheric pressure onto said advancing core, and cooling said molten sleeve on said core to form a solidified insulating plastic covering on said core.

10. A method according to claim 9, wherein said bundle includes a metal shield wrapped around said insulated conductor wires, said shield having an outer coating of a carboxylated polymer effective to adhere said molten plastic to said shield.

11. A method according to claim 10, wherein said metal shield is aluminium.

12. A method according to claim 11, wherein said plastic is a polyethylene.

13. A method according to claim 9, wherein the radially inwardly directed streams are diametrically opposed.

14. A die assembly for the extrusion of molten insulating plastic around an advancing core, including:

an extrusion die comprising a cylindrical body having a centrally disposed die bore therethrough defining an inlet and an outlet opposed to said inlet for an advancing core, circumferential channel means spaced around said bore in an outer surface of said body, for flow of molten plastic, a pair of radially inwardly directed passages communicating said channel means with said bore, and a core guide having a continuous bore therethrough for an advancing core, adapted to be removably seated in a fixed position in the die bore, said core guide including a deflecting surface which defines with said die bore an annular space, said deflecting surface being adapted to deflect molten plastic delivered through said passages along said annular space towards said die bore outlet, said annular space decreasing in cross-section towards said outlet.

15. A die assembly according to claim 14, wherein said radial passages are diametrically opposed, said circumferential channel extending from one radial passage to the other.

16. A die assembly according to claim 15, wherein said core guide has a core outlet end spaced apart from the die outlet and within the die bore.

17. A die assembly according to claim 15, wherein said core guide has a core outlet end adjacent said die bore outlet, said core outlet end being substantially cylindrical.

18. An extrusion die for use in the extrusion of molten insulating plastic around an advancing core, comprising:

a cylindrical body having a centrally disposed bore therethrough defining an inlet and an outlet opposed to said inlet, a circumferential channel means spaced around said bore, in an outer surface of said body, for flow of molten plastic, and a pair of inwardly directed radial passages communicating said circumferential channel means with said bore, said bore including a machined cylindrical surface extending from said inlet to said radial passages, adapted to mate with a core guide such that said cylindrical body supports said core guide in a fixed seated position, and said bore including a frusto-conical surface extending from said radial passages towards said outlet.

19. An extrusion die according to claim 18, wherein said radial passages are diametrically opposed, said circumferential channel extending from one radial passage to the other.

20. A core guide for guiding an advancing core through an extrusion die comprising:

a body adapted to be removably seated in a bore of a cross-head extrusion die, a continuous bore in said body for an advancing core, a core inlet end and a core outlet end opposed to said core inlet end, said body including:

a cylindrical centering body portion at said core inlet end, adapted to fit the core guide centrally in the die bore, in a fixed-centered position, and a frusto-conical body portion including a deflecting surface to deflect molten plastic towards the core outlet end.

21. A core guide according to claim 20, wherein said centering body portion has a substantially cylindrical machined outer surface.

22. A core guide according to claim 21, wherein said frusto-conical body portion extends from said centering body portion to said core outlet end.

23. A core guide according to claim 20, including a guide element mounted in said continuous bore, said element having a cylindrical bore therethrough to provide a fine clearance with a core advancing therethrough.

24. A core guide according to claim 23, wherein said guide element is a diamond having a lapped cylindrical bore therethrough.

25. A core guide according to claim 21, wherein said frusto-conical body portion extends from said centering body portion to a cylindrical end portion at said core outlet end.

26. A die assembly according to claim 16, wherein said die outlet comprises an insert of material resistant to wear and resistant to molten plastic and heat therefrom, said insert being effective to conduct heat away from the outlet; a diamond guide element cylindrically bored to a fine, accurate tolerance disposed in the core bore to provide a fine clearance between said core bore and an advancing core; said die bore including a machined cylindrical bore wall and said core guide including a cylindrical portion having a machined cylindrical surface, said machined cylindrical bore wall mating with said machined cylindrical surface with a narrow clearance such that said core guide sits in said die in a fixed centered position with the core guide centrally disposed in the die.

27. An extrusion die according to claim 18, wherein said frusto-conical surface includes an insert of material resistant to wear and resistant to molten plastic and the heat therefrom, said insert being effective to conduct heat away from said outlet.

28. An extrusion die according to claim 18, wherein said frusto-conical surface terminates in a cylindrical surface at said bore outlet.

* * * * *